United States Patent
Sixtensson et al.

(10) Patent No.: US 10,969,287 B2
(45) Date of Patent: Apr. 6, 2021

(54) FILLING BODY FOR REDUCING A VOLUME OF A PRESSURE MEASUREMENT CHAMBER

(71) Applicant: Endress+Hauser SE+Co. KG, Maulburg (DE)

(72) Inventors: Daniel Sixtensson, Potsdam (DE); Fred Haker, Kleinmachnow (DE); Dennis Müller, Groß Kreutz OT (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 209 days.

(21) Appl. No.: 16/325,824

(22) PCT Filed: Jul. 25, 2017

(86) PCT No.: PCT/EP2017/068711
§ 371 (c)(1),
(2) Date: Feb. 15, 2019

(87) PCT Pub. No.: WO2018/033348
PCT Pub. Date: Feb. 22, 2018

(65) Prior Publication Data
US 2019/0204174 A1    Jul. 4, 2019

(30) Foreign Application Priority Data

Aug. 16, 2016   (DE) .................... 10 2016 115 197.1

(51) Int. Cl.
*G01L 9/00*      (2006.01)
*G01L 19/04*     (2006.01)
*G01L 19/14*     (2006.01)

(52) U.S. Cl.
CPC ............ *G01L 19/04* (2013.01); *G01L 9/0041* (2013.01); *G01L 19/147* (2013.01)

(58) Field of Classification Search
CPC ... G01L 9/00–12; G01L 9/0041; G01L 19/00; G01L 19/04; G01L 19/14; G01L 19/147
See application file for complete search history.

(56) References Cited

U.S. PATENT DOCUMENTS

| | | | |
|---|---|---|---|
| 4,502,335 A | 3/1985 | Wamstad et al. | |
| 5,604,363 A * | 2/1997 | Ichihashi | G01L 19/147 257/274 |

(Continued)

FOREIGN PATENT DOCUMENTS

| | | |
|---|---|---|
| CN | 2718547 Y | 8/2005 |
| CN | 1839300 A | 9/2006 |

(Continued)

OTHER PUBLICATIONS

Search Report for German Patent Application No. 10 2016 115 197.1, German Patent Office, dated Apr. 5, 2017, 5 pp.

(Continued)

*Primary Examiner* — Nguyen Q. Ha
(74) *Attorney, Agent, or Firm* — Kelly J. Smith; Endress+Hauser (USA) Holding Inc.

(57) ABSTRACT

The present disclosure relates to a filling body for reducing a volume of a pressure measurement chamber, which is to be filled with a pressure transmitting fluid, surrounding a pressure sensor. The filling body includes a recess for receiving the pressure sensor and has a free-standing base projecting into the recess on which the pressure sensor can be mounted. A filling body base supporting the filling body is provided on a side of the filling body facing away from the recess. The filling body can be mounted in an application location in such a way that the filling body base supports the otherwise free-standing filling body. The filling body base has a base surface that is smaller than a base surface of a filling body region that is adjacent to the filling body base and surrounding the recess.

14 Claims, 3 Drawing Sheets

(56) References Cited

U.S. PATENT DOCUMENTS

| | | | |
|---|---|---|---|
| 6,345,974 B1 | 2/2002 | Kawasaki et al. | |
| 8,794,077 B2* | 8/2014 | Philipps | G01L 9/0042 73/754 |
| 2010/0308426 A1* | 12/2010 | Getman | G01L 19/147 257/419 |
| 2015/0219513 A1* | 8/2015 | Uematsu | G01L 9/0052 73/754 |
| 2015/0364455 A1* | 12/2015 | Crobu | H01L 25/18 257/417 |
| 2016/0069765 A1* | 3/2016 | Ishikawa | G01L 19/0654 73/431 |
| 2017/0131169 A1* | 5/2017 | Takimoto | G01L 19/0645 |

FOREIGN PATENT DOCUMENTS

| | | | | |
|---|---|---|---|---|
| CN | 1864055 A | 11/2006 | | |
| CN | 101410702 A | 4/2009 | | |
| CN | 101464198 A | 6/2009 | | |
| CN | 102749167 A | 10/2012 | | |
| CN | 203595580 U | 5/2014 | | |
| CN | 104246465 A | 12/2014 | | |
| CN | 204101229 U | 1/2015 | | |
| CN | 104515643 A | 4/2015 | | |
| CN | 104634506 A | 5/2015 | | |
| CN | 204944730 U | 1/2016 | | |
| DE | 3436440 A1 | 4/1986 | | |
| DE | 102006013414 A1 | 9/2006 | | |
| DE | 102006057828 A1 | 6/2008 | | |
| DE | 102009001133 A1 | 8/2010 | | |
| DE | 102015116059 A1 | 3/2017 | | |
| JP | 10122997 A | 5/1998 | | |
| JP | 2002350260 A | * | 12/2002 | G01L 9/04 |
| JP | 2008128644 A | 6/2008 | | |
| RU | 2517798 C1 | 5/2014 | | |
| WO | WO-2019150871 A1 | * | 8/2019 | G01L 9/00 |

OTHER PUBLICATIONS

International Search Report for Patent Application No. PCT/EP2017/068711, WIPO, dated Oct. 17, 2017, 17 pp.

* cited by examiner

FILLING BODY FOR REDUCING A VOLUME OF A PRESSURE MEASUREMENT CHAMBER

CROSS-REFERENCE TO RELATED APPLICATIONS

The present application is related to and claims the priority benefit of German Patent Application No. 10 2016 115 197.1, filed on Aug. 16, 2016 and International Patent Application No. PCT/EP2017/068711, filed on Jul. 25, 2017 the entire contents of which are incorporated herein by reference.

TECHNICAL FIELD

The invention relates to a filling body for reducing a volume—to be filled with a pressure-transmitting liquid—of a pressure measurement chamber surrounding a pressure sensor.

BACKGROUND

In industrial pressure measurement technology, pressure sensors designed, inter alia, as absolute, relative or differential pressure sensors—frequently also referred to as semiconductor sensors or sensor chips—are used and are produced using processes known from semiconductor technology. These pressure sensors are mechanically sensitive and are therefore regularly used in a pressure measurement chamber filled with a pressure-transmitting liquid. There, they are impinged by a pressure to be detected by the pressure sensor via a pressure supply connected to the pressure measurement chamber, e.g. an upstream diaphragm seal. To effect a pressure transmission that is as uncorrupted as possible, fluids that are as incompressible as possible and have a low coefficient of thermal expansion, such as silicone oils, are used for this purpose. However, these liquids also have pressure transmission properties that are dependent on the temperature and the pressure to be transmitted, and whose influence on the achievable measurement accuracy is all the greater the larger the required fluid volume. For this reason, in some pressure measurement devices, filling bodies are used which reduce the volume to be filled with the fluid.

In DE 10 2006, 057, 828 A1 a differential pressure transducer is described that comprises a recess provided in a solid metallic block into which recess a glass body surrounded on the outside by an adapter piece having a cylindrical cross-section is inserted. The glass body has a recess into which a differential pressure sensor is inserted, which comprises a measurement diaphragm arranged on a main body with the inclusion of a pressure chamber. The differential pressure sensor is electrically connected via connecting leads which are glazed into the glass body in a pressure-tight manner. The pressure transducer comprises a first diaphragm seal via which a pressure measurement chamber surrounding the outside of the measurement diaphragm is impinged with a first pressure. At the same time, the pressure chamber enclosed beneath the measurement diaphragm is impinged with a second pressure via a second diaphragm seal. In this pressure transducer, the mating body together with the glass body connected thereto completely fills the interior of the recess in the solid block of the measuring transducer, so that in the recess adjoining the pressure measurement chamber, only a gap surrounding the differential pressure sensor inside the recess in the glass body has to be filled with the pressure-transmitting fluid. However, there is the risk that, due to different coefficients of thermal expansion of the solid block, the mating body, the glass body and the pressure sensor, thermomechanical stresses can develop which not only stress the glass body but can also have a disadvantageous effect on the measurement properties of the pressure sensor.

An approach complementary thereto is followed in the pressure measurement device described in U.S. Pat. No. 4,502,335. This comprises a housing having a pressure measurement chamber enclosed therein, in which a pressure sensor externally mounted on a carrier is surrounded on all sides by a hollow cylindrical filling body mounted in a free-floating manner. For this purpose, grommets are provided in the carrier, into which rod-shaped connecting leads for the electrical terminal of the pressure sensor are inserted, and which bear the filling body. The connecting leads pass through bores through the filling body provided in the filling body to the side of the filling body facing away from the carrier, where they are connected to the filling body by solderings carrying the filling body.

This free floating mounting of the filling body offers the advantage that practically no thermomechanical stresses attributable to different thermal expansion coefficients of the housing, carrier, filling body and/or pressure sensor are induced and/or transmitted that place stress on the grommets in the carrier and/or the pressure sensor.

Moreover, the filling body can be made much simpler and less expensive than glass bodies inserted in a mating piece with the connecting leads glazed therein in a pressure-tight manner.

However, the filling body and pressure sensor must be mounted separately from one another in this case. In this case, they must be very precisely aligned spatially relative to each other in order to prevent the filling body and pressure sensor from touching, which would have a disadvantageous effect on the measurement characteristics of the pressure sensor.

Beyond that, as a result of the mechanical connection between the carrier and the pressure sensor that is required for the sensor assembly, thermo-mechanical stresses can occur that affect the transmission behavior of the measurement diaphragm of the pressure sensor, thus impairing the achievable measurement precision and its reproducibility.

A solution to the latter problem described, for example, in DE 34 36 440 A1 is to mount the pressure sensor on the carrier on a free-standing base, the base surface of which is smaller than the base surface of the pressure sensor mounted thereon. The base can be an integral part of the metallic carrier, or can be configured as a separate component which is inserted by being glazed into a bore in the carrier. Glazed-in bases may be made of a material whose coefficient of thermal expansion is better adapted to the coefficient of thermal expansion of the pressure sensor than to that of the typically metallic carrier. However, the number of material combinations among which pressure-tight glazings can be produced may be limited. Furthermore, glazings represent an additional, comparatively complex production step.

SUMMARY

An object of the invention is to provide a filling body which can be inserted in a simple and cost-effective manner into a pressure measurement chamber of a pressure measurement device, and by means of which as few thermomechanical stresses as possible are caused and/or transmitted at the application location that have a disadvantageous effect on the measuring properties of a pressure sensor arranged in the pressure measurement chamber.

For this purpose, the invention comprises a filling body for reducing a volume to be filled with a pressure transmitting fluid of a pressure measurement chamber surrounding a pressure sensor, having:
- a recess for receiving the pressure sensor, and
- a freestanding base projecting into the recess on which the pressure sensor in the recess can be mounted, distinguished in that:
- on a side of the filling body facing away from the recess, a filling body base carrying the filling body is provided, by means of which the filling body can be mounted at an application location in such a way that the filling body base carries the otherwise free-standing filling body, in particular a filling body base, the base surface of which is smaller than a base surface of a filling body region that borders the filling body base and surrounds the recess.

Filling bodies according to the invention offer the advantage that they provide both the functionality of a filling body and that of an element carrying the pressure sensor.

In addition, they offer the advantage that stresses are reduced that are caused by the filling body and/or transferable via the filling body by the freestanding mounting of the filling body at the application location that is enabled by the filling body base.

Further, they offer the advantage that they are produced as one-piece, purely mechanical components in a simple and cost-effective manner, are equipped with the pressure sensor, and can be mounted at the application location.

A first further development is distinguished in that the filling body consists of an insulator, in particular made of a ceramic material, in particular of aluminum oxide, silicon nitride ($Si_3N_4$) or silicon carbide (SiC).

A second further development is distinguished in that:
- the filling body base has a height of at least 0.4 mm in a direction running parallel to the longitudinal axis of the base, and/or
- the base surface of the filling body base is smaller than a base surface of the recess in the filling body, larger than a base surface of the base (5), and/or larger than a minimum area of 2 $mm^2$.

A third further development is distinguished in that electrically conductive contact areas, in particular contact areas applied as metallization, are provided on a side of the filling body facing away from the filling body base, via each of which an electrical terminal—said connection being connectable to the respective contact surface via a lead, in particular a bonding wire—of a functional element which can be mounted on the filling body, in particular a sensor terminal of the pressure sensor mountable on the base, or a functional element connection of a further functional element mountable on the filling body is electrically connectable.

A first embodiment is distinguished in that bores which pass through the filling body outside of the recess are provided through each of which a connecting lead that can be connected to an electrical terminal of a functional element mountable on the filling body, in particular a sensor terminal of the pressure sensor or a functional element connection of a further functional element, can be passed through.

A fourth further development is distinguished in that an extension integrally formed on the filling body region surrounding the recess in the filling body is provided on a side facing away from the filling body base, in particular an essentially disc-like extension, the disc thickness of which is less than a height of the filling body region surrounding the recess and the surface of which facing away from the filling body base lies in the same plane as the surface of the filling body region adjacent thereto that faces away from the filling body base.

A further development of the filling body according to the first embodiment and the fourth development is distinguished in that the bores in the region of the extension pass through the filling body.

A second embodiment is distinguished in that:
- the freestanding base has a length of at least a few tenths of a millimeter, in particular a length on the order of 0.5 mm, and/or
- the base has a base surface that is smaller than a base surface of the pressure sensor to be mounted thereon, the base having in particular a circular or annular base surface with an outer diameter in the range from 0.5 mm to 7 mm, or a square or rectangular base surface with side lengths in the range from 0.5 mm to 7 mm.

The invention further comprises a pressure measurement module having a filling body according to the invention, that is distinguished in that a pressure sensor is arranged in the recess of the filling body and is mounted on the base by means of a joint, in particular a bond.

Pressure measurement modules according to the invention offer the advantage that they are available as a modular unit with electrical and/or mechanical properties which can be tested, in particular determined and/or verified before they are mounted as a modular unit at the application location.

In addition, they offer the advantage that they can be mounted via their filling body base at the application location without the assembly process having a significant influence on the pressure measurement properties of the pressure sensor mounted therein on the base. Because the pressure sensor is part of the pressure measurement module, an extremely precise alignment of the filling body or pressure measurement module is not required during the assembly at the application location.

A first further development of the pressure measurement module is distinguished in that, in addition to the pressure sensor, at least one further functional element is provided on the filling body, in particular a temperature sensor and/or an absolute pressure sensor, in particular a functional element arranged on a face of the filling body that faces away from the filling body base and/or a functional element arranged in a recess provided on a side of the filling body that faces away from the filling body.

A further development of the pressure measurement module or its first further development is distinguished in that:
- electrically conductive contact regions, in particular contact regions applied as metallization, are provided on a side of the filling body facing away from the filling body base, and
- electrical terminals of at least one functional element provided on the filling body, in particular sensor terminals of the pressure sensor and/or functional element connections of at least one further functional element arranged on the filling body are each joined to one of the contact surfaces via a lead, in particular a bonding wire, and can be electrically connected via the respective contact surface, in particular can be electrically connected to a measuring device or a test device.

The invention additionally comprises a pressure measurement device having a pressure measurement module according to the invention, which is distinguished in that:

the pressure measurement module is inserted on a carrier, in particular a metallic carrier, into a pressure measurement chamber surrounded by a housing, the filling body is mounted on the carrier in a freestanding manner by means of a joint, in particular a bond, that joins the filling body base to the carrier, The sensor terminals of the pressure sensor, in particular the sensor terminals of the pressure sensor and functional element connections of at least one further functional element arranged on the filling body, are each connected via a lead directly to an associated connecting lead, in particular a rigid, straight connecting lead, in particular a terminal post, or are connected via the lead to a contact surface arranged on the filling body and connected to the connecting lead via a further lead, and the connecting leads pass through an electrically insulating grommet provided in the carrier and a bore passing through the filling body.

A first further development of the pressure measurement device is distinguished in that the carrier comprises a recess into which the filling body base is inserted.

A second further development of the pressure measurement device is distinguished in that:

the filling body on a side facing away from the filling body base comprises an extension molded onto its filling body region surrounding the recess in the filling body and the carrier comprises a carrier region that almost completely fills a cavity located below the extension of the filling body mounted thereon, and/or the carrier comprises a recess in which a filling body region adjacent to the filling body base, in particular the filling body region and an extension of the filling body integrally formed thereon, is arranged in a freestanding manner, in particular a recess which is sized in such a way that a gap exists between the filling body and the carrier, except for the filling body base that is connected to the carrier, in particular a gap having a gap width in the range from 50 μm to 300 μm.

The invention further comprises a method for producing pressure measurement devices, distinguished in that:

pressure measurement modules are made of prefabricated filling bodies and pressure sensors, in particular made and tested, in particular made by mounting the pressure sensors by machine on the filling bodies, in particular gluing them on, the pressure measurement modules are each mounted on a carrier, and the pressure measuring modules on the carriers are each inserted into a pressure measurement chamber surrounded by a housing.

BRIEF DESCRIPTION OF THE DRAWINGS

The invention and its advantages will now be explained in detail using the figures in the drawing which show two exemplary embodiments. The same elements are indicated by the same reference numbers in the figures. In order to be able to show components of different sizes, an illustration that is not always true-to-scale was chosen.

DETAILED DESCRIPTION

Figure 1:
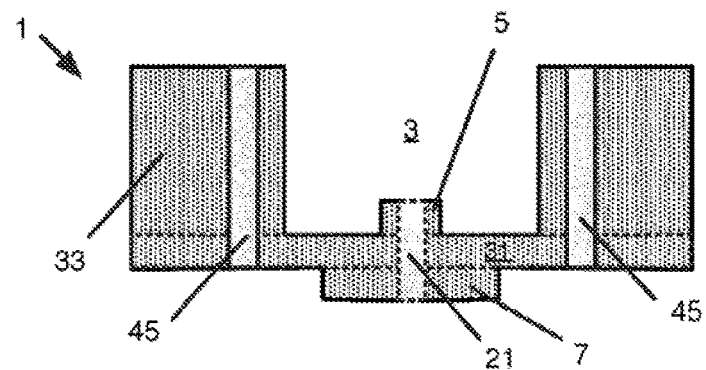
FIG. 1 shows a filling body according to the present disclosure.

FIG. 1 shows a first exemplary embodiment of a filling body 1 according to the invention for reducing a volume—to be filled with a pressure-transmitting liquid—of a pressure measurement chamber surrounding a pressure sensor. Filling bodies 1 according to the invention comprise a recess 3 for receiving a pressure sensor and, protruding into the recess 3, a free-standing base 5 on which the pressure sensor in the recess 3 can be mounted. Furthermore, they comprise a filling body base 7 which is arranged on their side facing away from the recess 3 and carries the filling body 1 and via which the filling body 1 can be mounted at an application location in such a way that the filling body base 7 carries the otherwise freestanding filling body 1.

The invention further comprises pressure measurement modules that comprise a filling body 1 according to the invention and a pressure sensor mounted on its base 5. These pressure measurement modules can be inserted directly as a modular unit into a pressure measurement chamber of a pressure measurement device or can be mounted beforehand on a carrier 9 on which they are then inserted into a pressure measurement chamber of a pressure measurement device.

Figure 2:
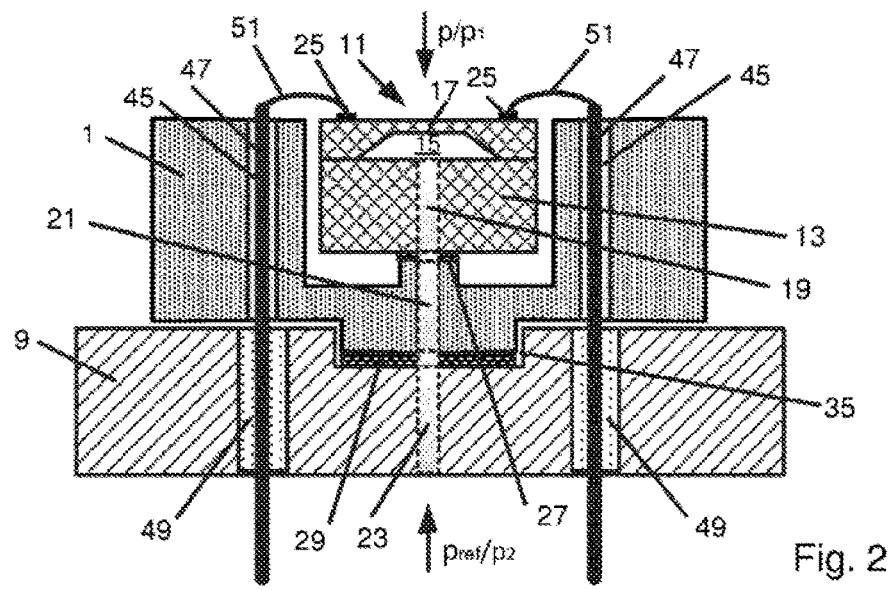
FIG. 2 shows a pressure measurement module mounted on a carrier and comprising the filling body of FIG. 1.
Figure 3:
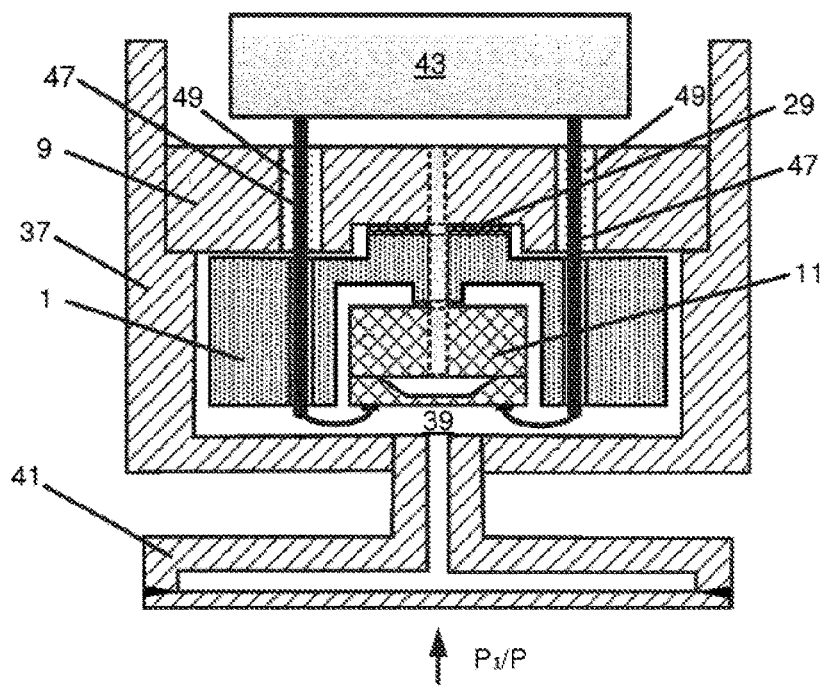
FIG. 3 shows a pressure measurement device equipped with the pressure measurement module of FIG. 2.

FIG. 2 shows for this purpose a pressure measurement module mounted on a carrier 9 which comprises the filling body 1 shown in FIG. 1 and a pressure sensor 11 mounted on its base 5. The carrier 9 is made, for example, of a metal, in particular a stainless steel, and in the exemplary embodiment shown here is designed as an essentially disc-like carrier 9. FIG. 3 shows a pressure measurement device which comprises the pressure measurement module shown in FIG. 2 that is mounted on the carrier 9.

The pressure sensor 11 can be designed, for example, as an absolute, relative or differential pressure sensor. Suitable pressure sensors 11 are, in particular, so-called semiconductor pressure sensors, for example pressure sensor chips produced based on silicon, which comprise a base body 13 and a measurement diaphragm 17 connected to the base body 13 with the inclusion of a pressure chamber 15. In the case of pressure sensors 11 designed as absolute pressure sensors, the pressure chamber 15 enclosed below the measurement diaphragm 17 is evacuated, so that a pressure p acting on the outside of the measurement diaphragm 17 effects a deflection of the measurement diaphragm 17 dependent on the absolute pressure to be measured. Pressure sensors 11 designed as relative or differential pressure sensors comprise a bore 19 extending through the base body 13 and opening into the pressure chamber 15 via which a further pressure $p_{ref}$, $p_2$ can be applied to the pressure chamber 15. In measuring relative pressure, this is a reference pressure $p_{ref}$, for example an atmospheric pressure, relative to which the pressure p acting on the outside of the measurement diaphragm 17 is to be measured. In measuring differential pressure, this is a second pressure $p_2$ which, together with the first pressure $p_1$ acting on the outer side of the measurement diaphragm 17, causes a deflection of the measurement diaphragm 17 that depends on the difference of the two pressures $p_1$, $p_2$.

Filling bodies 1 which can be inserted in connection with pressure sensors 11 designed as relative or differential pressure sensors accordingly have a pressure supply line 21 in the filling body 1 which passes through the base 5 through the filling body 1, preferably likewise configured as a bore, via which the pressure chamber 15 can be impinged by the further pressure $p_{ref}$, $p_2$ through the bore 19 in the base body 13. In this variant, a pressure supply line 23, which is connected to the pressure chamber 15 via the pressure supply line 21 in the filling body 1 and the bore 19 in the base body 13, is also to be provided in the carrier 9. Bore 19, pressure supply line 21 and pressure feed lead 23 are shown in a dashed line in the figures as a variant.

Pressure sensors 11 have an electromechanical transducer, for example a capacitive or piezoresistive transducer, which is not shown here in detail and converts a deflection of measurement diaphragm 17 depending on the pressure acting on measurement diaphragm 17 into an electrical quantity. This electrical quantity is recorded in measuring mode by means of a measurement device to be connected to electrical sensor terminals 25 of the pressure sensor 11, and is converted into an electrical signal that is dependent on the pressure to be measured and is then available for display and/or further processing.

Filling bodies 1 according to the invention offer the advantage that they are produced as one-piece, purely mechanical components in a simple and cost-effective manner, equipped with the pressure sensor 11 and can be mounted at the application location. In this case, the pressure sensor 11 is fastened on the base 5 by means of a joint 27, preferably a bond. This process step can also inexpensively be done by machine, wherein in one operating cycle, a larger number of filling bodies 1 is preferably equipped with pressure sensors 11 by machine.

Then the pressure measurement module comprising the filling body 1 and the pressure sensor 11 mounted thereon is available as a modular unit with electrical and/or mechanical properties that can be tested, in particular determined and/or verified before they are mounted as a modular unit at the application location.

The filling body base 7 enables an essentially freestanding assembly of the filling body 1, in which the filling body 1 is in direct mechanical contact with the environment exclusively via the filling body base 7. This offers the advantage that pressure measurement modules can be mounted via their filling body base 7 at the application location without the assembly process having a significant influence on the pressure measurement properties of the pressure sensor 11 mounted therein on the base 5. Because the pressure sensor 11 is part of the pressure measurement module, an extremely precise alignment of the filling body 1 or pressure measurement module is not required during the assembly.

Pressure measurement modules according to the invention offer the advantage that they can be prefabricated in larger quantities and mounted mechanically on a corresponding number of carriers 9 by their filling body base 7 being connected to the carrier 9 via a joint 29, preferably an adhesive bond.

The freestanding assembly of the pressure measurement module at the application location enabled by the filling body 7 makes it possible for thermomechanical stresses arising from the outside from different thermal expansion coefficients to be transferred to the pressure measurement module only via the filling body base 7.

In addition, thermal expansions of the filling body 1 which act in the axial direction, i.e., parallel to the longitudinal axis of the base 5, and thermomechanical stresses acting in this direction that are transferred to or via the filling body 1 basically only lead to an axial displacement of the pressure sensor 11 mounted on the base 5, which has practically no effect on the measuring properties of the pressure sensor 11.

This advantage is already achieved with an embodiment in which the filling body base is formed by a planar bottom 31, indicated by dashed lines in FIG. 1, of a filling body region 33 surrounding the recess 3.

However, as shown here, the filling body base 7 preferably has a base surface which is smaller than the base surface of the filling body region 33 adjacent thereto and comprising the recess 3. This reduces the base surface of the joint 29 via which thermomechanical stresses can form, and/or via which thermomechanical stresses can be transmitted. This is in particular advantageous with regard to stresses acting in the direction running perpendicular to the longitudinal axis of the base 5 which could otherwise be transmitted via the base 5 to the pressure sensor 11 where they could lead to a change in the measurement properties of the pressure sensor 11, in particular the pressure-dependent deformability of the measurement diaphragm 17. The protruding filling body base 7 can also easily have a base surface which is smaller than the base surface of the recess 3 in the filling body 1.

With regard to automatic alignment of the filling body longitudinal axis and/or ensuring the highest possible density and pressure-resistant joint 29 between filling body base 7 and carrier 9, the filling body base 7 preferably has a base surface which is larger than the base surface of the base 5 and/or does not fall below a minimum size of 2 mm².

Filling bodies 1 with a filling body base 7 projecting in the axial direction can in principle be mounted on a planar surface of a carrier. However, the protruding filling body base 7 is preferably inserted into a recess 35 provided for this purpose in the carrier 9. This preferably has a base surface which is slightly larger than the base surface of the filling body base 7, so that the filling body base 7 in the recess 35 is surrounded on the outside by a gap. This offers the advantage that the stresses transmitted to the filling body base 7 via the joint 29 can be dissipated at least partially above the height of the freestanding filling body base 7 without a larger cavity being produced between the carrier 5 and the filling body region 33 adjoining the filling body base 7 that would counteract the function of the filling body 1. For this purpose, the filling body base 7 preferably has a height of at least 0.4 mm.

In addition, the height of the filling body base 7 and a depth of the recess 35 in the carrier 9 are preferably matched to one another such that a gap exists between the bottom 31 of the filling body region 33 adjoining the filling body base 7 and the carrier 9. Preferably, the gap surrounding the filling body base 7 on the outside and/or also the gap between carrier 9 and bottom 31 has a gap width that, on the one hand, is as small as possible and, on the other hand is large enough to ensure that the components in these regions do not touch even when there are different degrees of thermal expansion of filling body 1 and carrier 9. A minimum gap width required for this purpose is to be specified as a function of the manufacturing tolerances of the filling body 1 and the carrier 9, their coefficients of thermal expansion, and the temperature range in which the pressure measurement module can be used. For this purpose, a gap width on the order of 50 µm to 300 µm, for example, can be provided.

Base 5 and pressure sensor 11 can basically have base surfaces of comparable size. However, to protect the pressure sensor 11 from thermomechanical stresses, the base 5 preferably has a base surface which is smaller than the base surface of the pressure sensor 11. Via this geometry, an additional mechanical decoupling of the pressure sensor 11 is effectuated that protects the pressure sensor 11 from thermomechanical stresses acting thereon or transmittable thereto.

Semiconductor pressure sensors usually have a base surface—generally rectangular or square—whose size is on the order of 1 mm$^2$ to 100 mm$^2$ depending on the measurement range and measurement sensitivity. In this regard, the base 5 preferably has a circular or annular base surface whose outer diameter is preferably in the range from 0.5 mm to 7 mm, depending on the size of the base surface of the pressure sensor 11. Alternatively, the base 5 can also have a square or rectangular base surface whose outer sides have lengths in the range from 0.5 mm to 7 mm.

The free-standing base 5 offers the advantage that, despite the decoupling caused by the projecting filling body base 7, any stresses transmitted to the base 5, such as the thermomechanical stresses caused by different coefficients of thermal expansion of filling body 1 and carrier 9 can be dissipated over the entire length of the freestanding base 5. For this purpose, the free-standing base 5 preferably has a length no less than a few tenths of a millimeter, e.g. a length on the order of 0.5 mm.

A further reduction of thermomechanical stresses transferable to the pressure sensor 11 at the application location is preferably produced by both the joint 27 between base 5 and pressure sensor 11 and the joint 29 between filling body base 7 and carrier 9 are bonds. To produce bonds, adhesives based on epoxy resin, thermoplastic adhesives, or silicon adhesives, such as silicon rubber, are in particular suitable. Adhesives are significantly more elastic than are rigid connections, such as bonded connections, soldered connections or welded connections, and are thus more able to compensate stresses resulting from different coefficients of thermal expansion of carrier 9 and filling body 1 and/or filling body 1 and pressure sensor 11.

The pressure measurement device shown in FIG. 3 comprises a housing 37 in which a pressure measurement chamber 39 is enclosed and can be impinged by a pressure p, p$_1$ via an upstream diaphragm seal 41. In this exemplary embodiment, the pressure measurement module shown in FIG. 2 and mounted on the carrier 9, is inserted into the housing 37 in such a way that the carrier 9 closes off the pressure measurement chamber 39 on the outside. In addition, the pressure measurement device comprises a measurement device 43 connected to the pressure sensor 11, for example a measurement electronics unit that, during measuring mode, determines the pressure acting on its measurement diaphragm 17 that is measured by the pressure sensor 11.

In principle, the electrical connection of the pressure sensor 11 can take place independently of the filling body 1, e.g. by its sensor terminals 25 being directly connected to the measurement device 43 via connecting leads running outside of the filling body 1. However, the electrical connection of the pressure sensor 11 preferably is accomplished by bores 45 passing through the filling body 1 outside the recess 3. In this design, a connecting lead 47 in each case runs through each bore 45 and can then be connected to one of the sensor terminals 25 on the side of the filling body 1 facing away from the filling body base 7. The connecting leads 47 are preferably rigid, straight leads, such as terminal posts, each of which is inserted into an electrically insulated grommet 49 provided in the carrier 9 through which they are guided out of the pressure measurement chamber 39.

Figure 4:
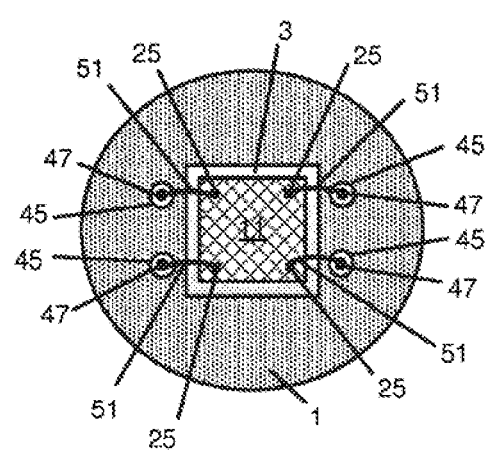
FIG. 4 shows a plan view of the pressure measurement module of FIGS. 2 and 3.

In this regard, FIG. 4 shows a plan view of the side of the pressure measurement module shown in FIGS. 2 and 3 facing away from the filling body base 7 in which the sensor terminals 25 are each connected via a lead 51, preferably a bonding wire, directly to the end of the associated connecting lead 47 protruding from the bore 45 in the filling body 1.

Figure 5:
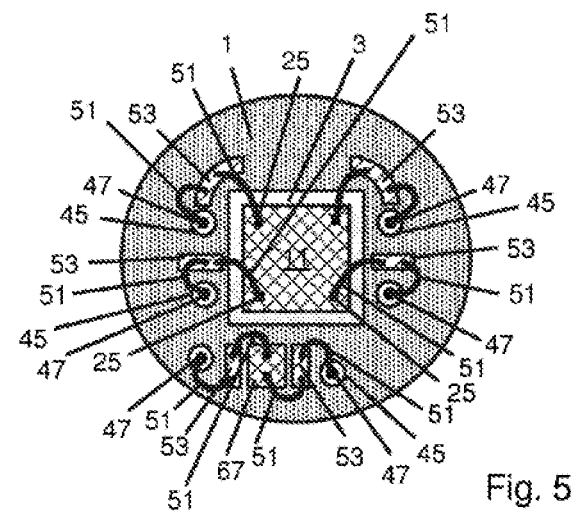
FIG. 5 shows a plan view of an alternative embodiment of the pressure measurement module of FIGS. 2 and 3.

FIG. 5 shows a plan view of an alternative embodiment, in which conductive contact surfaces 53 are arranged on the side of the filling body 1 facing away from the filling body base 7. Coatings applied to the surface of the filling body 1 as metallizations are especially suitable as contact surfaces 53. Each of these contact surfaces 53 is positioned and shaped in such a way that it can be connected via a first lead 51, in particular a bonding wire, to an electrical terminal of a functional element, e.g. one of the sensor terminals 25 of the pressure sensor 11, which is mountable on the filling body 1, and can then be electrically connected via the contact surface 53. In this regard, FIG. 5 shows an embodiment in which the contact surfaces 53 connected to the sensor terminals 25 via leads 51 are each connected via a further lead 51, in particular a further bonding wire, to a connecting lead 47 that passes through the filling body 1 via one of the bores 45 in the filling body 1.

Contact pads 53 offer the advantage that they can be used as a lead via which the electrical terminals connected thereto can be contacted at a location that is at a greater distance from the respective terminal.

Furthermore, in view of the aforementioned testing of pressure measurement modules, they offer the advantage that the electrical terminals connected via leads 51 to the contact surfaces 53 during the testing can be temporarily connected to a test device not shown here, and after the end of the testing can be removed again, without the need for the functional element or its terminals to mechanically contact the leads 51 connecting the contact surfaces 53.

Figure 6:
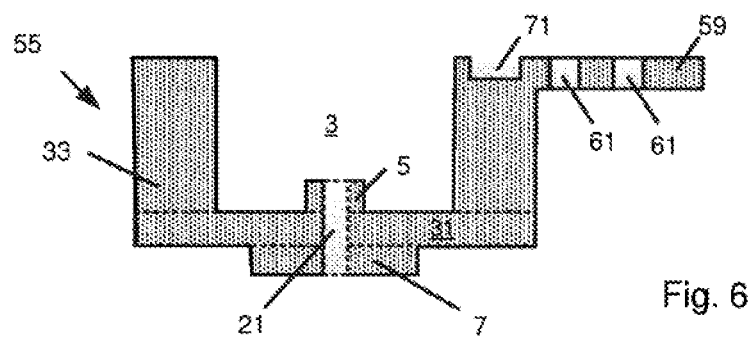
FIG. 6 shows a further filling body according to the present disclosure.
Figure 7:
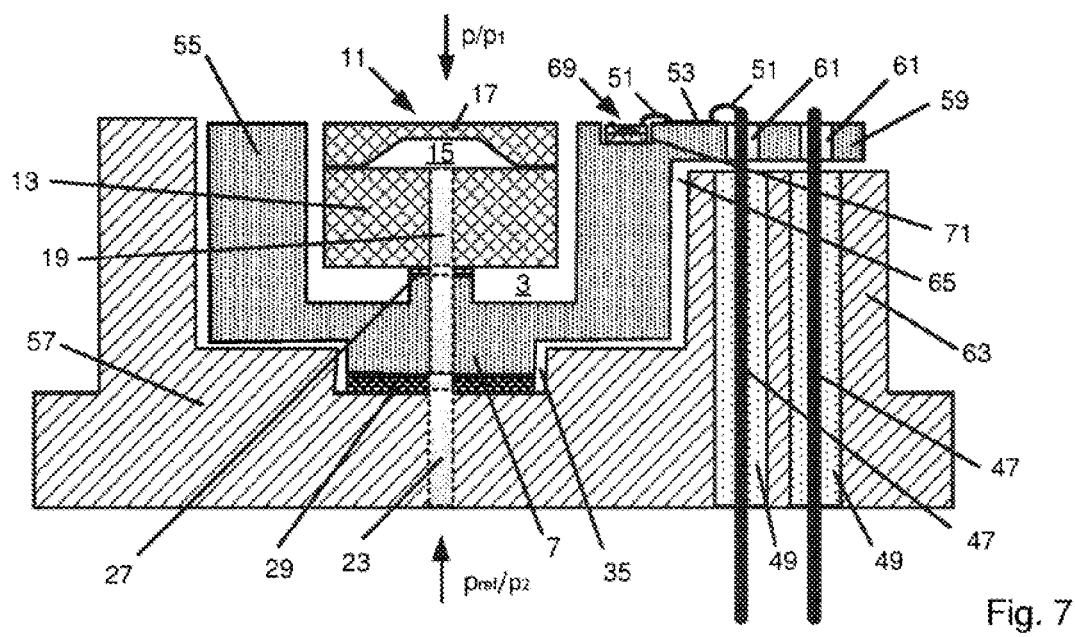
FIG. 7 shows a pressure measurement module mounted on a carrier and comprising the filling body of FIG. 6.
Figure 8:
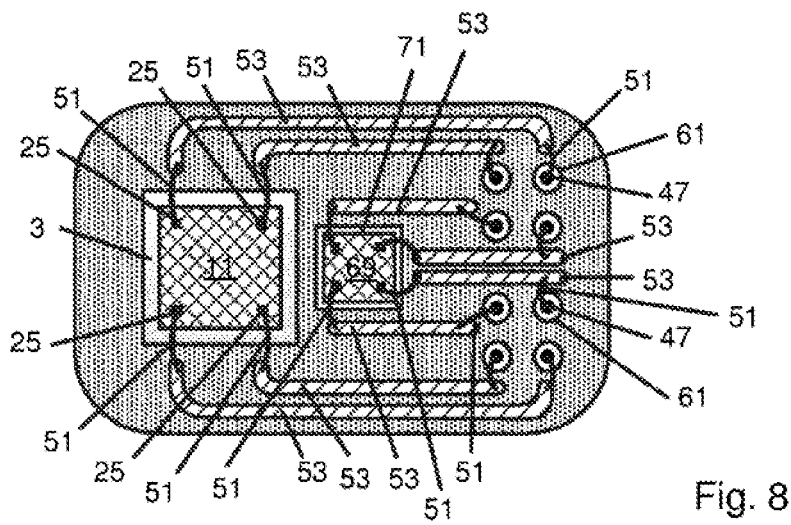
FIG. 8 shows a plan view of the pressure measurement module of FIG. 7.
Figure 9:
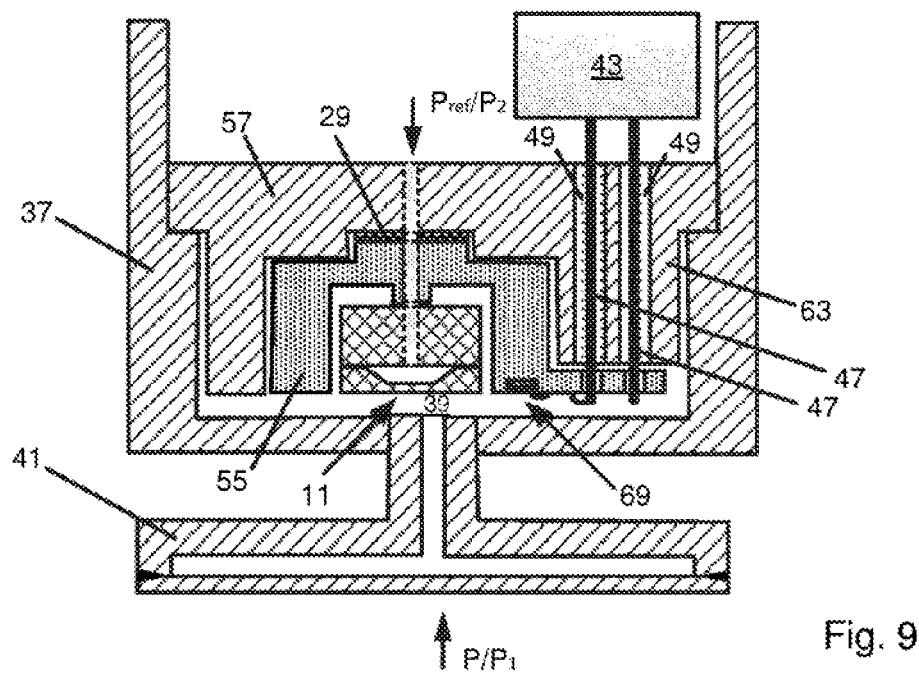
FIG. 9 shows a pressure measurement device equipped with the pressure measurement module of FIG. 7.

FIG. 6 shows an additional exemplary embodiment of a filling body 55 according to the invention. FIG. 7 shows a pressure measurement module mounted on a carrier 57 which comprises the filling body 55 depicted in FIG. 6 and a pressure sensor 11 mounted on its base 5. FIG. 8 shows a plan view of the pressure measurement module depicted in FIG. 7. FIG. 9 shows a pressure measurement device comprising the pressure measurement module of FIG. 7. Due to the great similarity with the corresponding previously described exemplary embodiments, only the existing differences will be described below; in other respects, reference is made to the descriptions of FIGS. 1 to 5.

The filling body 55 illustrated in FIG. 6 differs from the previously described filling body 1 in that it comprises, on its side facing away from the filling body base 7, an extension 59 molded on the filling body region 33 surrounding the recess 3 in the filling body 55. In the exemplary embodiment shown, the extension 59 is substantially disc-like and has a disc thickness that is less than the height of the filling body region 33 surrounding the recess 3. In this case, a surface of the extension 59 facing away from the filling body base 7 is preferably in the same plane as the surface of the filling body region 33 adjacent thereto facing away from the filling body base 7. However, extensions having a different shape may alternatively also be used.

The filling body 55 shown in FIGS. 6 to 9 also preferably comprises bores 61 passing through the filling body 55 in which connecting leads 47 provided for the electrical connection of the pressure sensor 11 can pass through the filling body 55. These holes can of course also be arranged in this case in the filling body region 33 surrounding the recess 3. However, the bores 61—as shown here—can alternatively also pass through the filling body 55 in the region of the extension 59. In this case, the additional space provided by the extension 59 offers the advantage that the position of the grommets 49 to be provided in the carrier 57 for the connecting leads 47 can be adapted to any constraints that may exist at the application location via a corresponding shaping of the extension 59 and a corresponding positioning of the bores 61.

Just like the filling body 1 illustrated in the plan view in FIG. 5, the filling body 55 illustrated in FIG. 6 is also preferably equipped with conductive contact regions 53 via which an electrical terminal of a functional element, in particular of the pressure sensor 11, which can be mounted on the filling body 55, can in each case be electrically connected in the manner already described in connection with FIG. 5. The contact surfaces 53 offer the advantage here that they can also easily bridge larger spaces between the electrical terminals and the associated connecting lead 47.

Just like the carrier 9 shown in FIG. 2, the carrier 57 also shown in FIG. 6 preferably has a recess 35 into which the filling body base 7 can preferably be inserted in a freestanding manner. In addition, the carrier 57 here preferably comprises a carrier region 63 that almost completely fills the one cavity located below the extension 59 of the filling body 55 mounted thereon. For this purpose, the carrier 57 may comprise e.g. a recess 65 adjacent to the recess 35 for receiving the filling body region 33 adjacent to the filling body base 7 and the extension 61 molded thereon. This recess 65 as well is preferably dimensioned in such a way that the filling body 55 can be inserted in a freestanding manner into the carrier 57 such that a gap also exists here between filling body 55 and 57 apart from the filling body base 7 connected to the carrier 57 via the joint 29. This gap preferably also has a gap width which corresponds to the dimensioning rules specified above.

Filling bodies 1, 55 according to the invention are preferably made of an electrical insulator. This offers the advantage that the filling body 1, 55 effects electric insulation of the pressure sensor 11 to be mounted thereon from the environment. Alternatively and/or in addition to this, filling bodies 1, 55 are preferably made of a material having a thermal expansion coefficient that is as similar as possible to the coefficient of thermal expansion of the pressure sensor 11 to be mounted thereon. This offers the advantage of a further reduction of thermomechanical stresses acting on the pressure sensor 11 and/or transmittable thereto. Ceramics such as alumina ($Al_2O_3$), silicon nitride ($Si_3N_4$) or silicon carbide (SiC) are particularly suitable in this respect.

The functionality of pressure measurement modules according to the invention can optionally be expanded by providing at least one further functional element 67, 69 on the filling body 1 55 in addition to the pressure sensor 11. These functional elements 67, 69 are preferably arranged on the side of the filling body 1 55 facing away from the filling body base 7. Filling elements 55 with extension 59 offer the advantage that more space is available for accommodating functional elements.

FIG. 5 shows a functional element 67 as an exemplary embodiment that is arranged directly on the face of the filling body 1 surrounding the recess 3 and facing away from the filling body base 7. This variant is suitable in particular for functional elements 67 having a low height. An example of this are temperature sensors like the thermocouple illustrated only schematically for example in FIG. 5. The temperature sensor can be used, for example, to measure a temperature in the immediate surroundings of the pressure sensor 11 on the basis of which the measuring device 43 then compensates for a temperature-dependent measurement error of the pressure measured with the pressure sensor 11.

FIGS. 7 to 9 show as a further exemplary embodiment a functional element 69 which is inserted into a recess 71 provided on the side of the filling body 55 facing away from the filling body base 7. This variant is particularly suitable for functional elements 69 of greater height, as, for example, the absolute pressure sensor depicted as an example in FIGS. 7 to 9. An absolute pressure sensor is advantageous, for example, in pressure measurement modules used in relative pressure or differential pressure measurement devices, where the absolute pressure measured therewith can be used as an additional measured value, as a reference value and/or for a compensation, executable by the measurement device 43, of an absolute pressure-dependent measuring error of the relative or differential pressure measured with the pressure sensor 11.

The additional functional elements 67, 69 are preferably electrically connected in the manner for connecting the pressure sensor 11 already described previously. Correspondingly, filling bodies 1, 55 equipped with at least one additional functional element 67, 69 preferably have a bore 45, 61 passing through the filling body 1, 55 for each functional element terminal of the respective functional element 67, 69 and in which a connecting lead 47 to be connected to the respective functional element terminal can pass through the filling body 1, 55. Here too, the functional element terminals can also be contacted either directly or via a contact surface 53 connected to the respective functional element terminal via a lead 51. FIGS. 5 and 8 show functional element terminals, each of which is connected via a lead 51 to the associated contact surface 53, which in turn is connected via a further lead 51 to the associated connecting lead 47.

Pressure measurement modules having further functional elements 67, 69 arranged on their filling bodies 1, 55 offer the advantage that the functional elements 67, 69 can be mounted and connected as a module component at the application location or on a carrier 9, 57 to be mounted at the application location.

Furthermore, for any intended testing of these pressure measurement modules, the electrical and/or mechanical properties of the further functional elements 67, 67 can also be tested, in particular determined, and/or verified at the same time.

The invention claimed is:

1. A filling body for reducing a volume to be filled with a pressure-transmitting fluid of a pressure measurement chamber surrounding a pressure sensor, the filling body comprising:
   a recess for receiving the pressure sensor; and
   a freestanding base projecting into the recess on which the pressure sensor is mountable;
   wherein a filling body base carrying the filling body is provided on a side of the filling body facing away from the recess;
   wherein the filling body is mountable at an application location such that the filling body base carries the free-standing filling body;

wherein a base surface of the filling body base is smaller than a base surface of a filling body region that borders the filling body base and surrounds the recess.

2. The filling body of claim 1, wherein the filling body is made of at least one of aluminum oxide ($Al_2O_3$), silicon nitride ($Si_3N_4$), and silicon carbide (SiC).

3. The filling body of claim 1, wherein the filling body base has a height of at least 0.4 mm in a direction parallel to a longitudinal axis of the filling body base; or
the base surface of the filling body base is less than a base surface of the recess in the filling body, larger than a base surface of the freestanding base or greater than a minimum area of 2 $mm^2$.

4. The filling body of claim 1, wherein electrically conductive contact surfaces are provided on a side of the filling body facing away from the filling body base, wherein an electrical terminal of a functional element that is mountable on the filling body is electrically connectable to the electrically conductive contact surfaces via a lead.

5. The filling body of claim 1, wherein bores extending through the filling body, outside of the recess, are each configured to receive a connecting lead that is connectable to an electrical terminal of a functional element mounted on the filling body.

6. The filling body of claim 5, wherein, on a side facing away from the filling body base, an extension is provided which is molded onto the filling body region surrounding the recess in the filling body.

7. The filling body of claim 6, wherein the bores of the extension pass through the filling body.

8. The filling body of claim 1, wherein the freestanding base has a length of at least three tenths of a millimeter; or
the freestanding base has a base surface that is smaller than a base surface of the pressure sensor mountable thereon.

9. A pressure measurement module, comprising:
a filling body for reducing a volume to be filled with a pressure-transmitting fluid of a pressure measurement chamber surrounding a pressure sensor, wherein the filling body includes:
a recess for receiving the pressure sensor; and
a freestanding base projecting into the recess on which the pressure sensor is mountable;
wherein a filling body base carrying the filling body is provided on a side of the filling body facing away from the recess;
wherein the filling body is mountable at an application location such that the filling body base carries the free-standing filling body;
wherein a base surface of the filling body base is smaller than a base surface of a filling body region that borders the filling body base and surrounds the recess;
wherein a pressure sensor is received in the recess of the filling body and is mounted to the freestanding base using a joint.

10. The pressure measurement module of claim 9, including at least one functional element in addition to the pressure sensor.

11. The pressure measurement module of claim 9, wherein electrically conductive contact surfaces are provided on a side of the filling body facing away from the filling body base, wherein an electrical terminal of a functional element that is mountable on the filling body is electrically connectable to the electrically conductive contact surfaces via a lead.

12. A pressure measurement device, including:
a pressure measurement module including a filling body for reducing a volume to be filled with a pressure-transmitting fluid of a pressure measurement chamber surrounding a pressure sensor, wherein the filling body includes:
a recess for receiving the pressure sensor; and
a freestanding base projecting into the recess on which the pressure sensor is mountable;
wherein a filling body base carrying the filling body is provided on a side of the filling body facing away from the recess;
wherein the filling body is mountable at an application location such that the filling body base carries the free-standing filling body;
wherein a base surface of the filling body base is smaller than a base surface of a filling body region that borders the filling body base and surrounds the recess;
wherein a pressure sensor is received in the recess of the filling body and is mounted to the base using a joint; and
wherein the pressure measurement module is inserted on a carrier into the pressure measurement chamber;
wherein the filling body is mounted on the carrier using a joint;
wherein sensor terminals of the pressure sensor are directly connected via a lead to an associated connecting lead; and
wherein the associated connecting lead passes through an electrically insulating grommet provided in the carrier and a bore passing through the filling body.

13. The pressure measurement device of claim 12, wherein the carrier includes a recess into which the filling body base is received.

14. The pressure measurement device of claim 12, wherein the filling body on a side facing away from the filling body base includes an extension that surrounds the recess, and the carrier includes a carrier region received in a cavity located below the extension; or
wherein the carrier includes a recess in which a filling body region adjacent the filling body base is arranged.

* * * * *